United States Patent
Cooper

(10) Patent No.: US 9,851,275 B2
(45) Date of Patent: Dec. 26, 2017

(54) SYSTEMS AND METHODS FOR TRACING AIR

(71) Applicant: Clifford A. Cooper, Kingston, NY (US)

(72) Inventor: Clifford A. Cooper, Kingston, NY (US)

(*) Notice: Subject to any disclaimer, the term of this patent is extended or adjusted under 35 U.S.C. 154(b) by 116 days.

(21) Appl. No.: 15/073,674

(22) Filed: Mar. 18, 2016

(65) Prior Publication Data

US 2016/0282220 A1  Sep. 29, 2016

Related U.S. Application Data

(60) Provisional application No. 62/139,449, filed on Mar. 27, 2015, provisional application No. 62/168,727, filed on May 30, 2015.

(51) Int. Cl.
*G01P 13/00* (2006.01)
*G01M 3/20* (2006.01)

(52) U.S. Cl.
CPC ................................. *G01M 3/20* (2013.01)

(58) Field of Classification Search
None
See application file for complete search history.

(56) References Cited

U.S. PATENT DOCUMENTS

| | | | | |
|---|---|---|---|---|
| 4,744,919 A | * | 5/1988 | O'Holleran | G01N 33/0011 239/2.1 |
| 5,457,989 A | * | 10/1995 | Minoshima | G01P 5/26 73/170.04 |
| 5,979,245 A | * | 11/1999 | Hirano | G01P 5/001 73/861.05 |
| 6,276,217 B1 | * | 8/2001 | Hirano | G01P 5/001 73/861.05 |

FOREIGN PATENT DOCUMENTS

| | | | | |
|---|---|---|---|---|
| CN | 205538686 U | * | 8/2016 | |
| JP | 56137253 A | * | 10/1981 | G01P 13/0093 |

* cited by examiner

*Primary Examiner* — Andre Allen
(74) *Attorney, Agent, or Firm* — Law Offices of Michael L. Wise, LLC

(57) ABSTRACT

Aspects of the invention are directed to a system including a tracer delivery device and a detector. The tracer delivery device is operative to emit a tracer including at least one of a terpene and a terpene alcohol into air. The detector is operative to detect the tracer in the air. In one or more embodiments, the tracer may include limonene mixed with isopropyl alcohol (LIPA). The corresponding detector may consist of a photoionization detector. The use of LIPA results in no emissions of global warming or environmentally dangerous chemicals, and the LIPA may be measured by photoionization with high sensitivity and in almost real time.

20 Claims, 6 Drawing Sheets

SYSTEMS AND METHODS FOR TRACING AIR

FIELD OF THE INVENTION

The present invention relates generally to systems and methods for tracing air, and, more particularly, to systems and methods for labeling, detecting, and measuring air movement and distribution.

BACKGROUND OF THE INVENTION

Air tracing methods may be utilized to characterize air movement, air leakage, air exchange, and air distribution in buildings and other structures. An air tracing method can be viewed as having two related parts, namely, the tracer broadcast part for the release and subsequent distribution of the tracer (i.e., analyte) in air, and the sampling part for the collection and measurement of the tracer from a known volume of the air. The success of an analytical tracer technology depends on the compatible interfacing of these two parts.

Sulfur hexafluoride ($SF_6$) is generally regarded as the standard agent to mix into and label an air mass for tracer studies, and it has been in use as a tracer since the 1950's. $SF_6$ is not chemically reactive, is non-toxic at use concentrations, is not typically found in the ambient air, and it can be detected using infrared sensing technology at parts per billion levels in air. Nevertheless, despite its long and widespread use, $SF_6$ is also the most potent of the known greenhouse gases, with a global warming potential 22,500 times that of carbon dioxide. $SF_6$ is also extremely long-lived, having an estimated atmospheric lifetime of 800-3,200 years. Lastly, detecting $SF_6$ utilizing infrared detection techniques typically requires that signals be averaged over relatively long periods of time, making the detection technique less sensitive to small temporal and spatial variations.

For the foregoing reasons, there is a need for alternative systems and methods for performing air tracing measurements.

SUMMARY OF THE INVENTION

Embodiments of the present invention address the above-identified need by providing alternative systems and methods of tracing air.

Aspects of the invention are directed to a system comprising a tracer delivery device and a detector. The tracer delivery device is operative to emit a tracer comprising at least one of a terpene and a terpene alcohol into air. The detector is operative to detect the tracer in the air.

Additional aspects of the invention are directed to a method of tracing air. A tracer comprising at least one of a terpene and a terpene alcohol is emitted into air using a tracer delivery device. Subsequently, the tracer is detected in the air by a detector.

Even additional aspects of the invention are directed at a method of tracing air. A tracer comprising at least one of a terpene and an alcohol is emitted into the air using a tracer delivery device. The tracer is detected in the air using a photoionization detector.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

Figure 1:
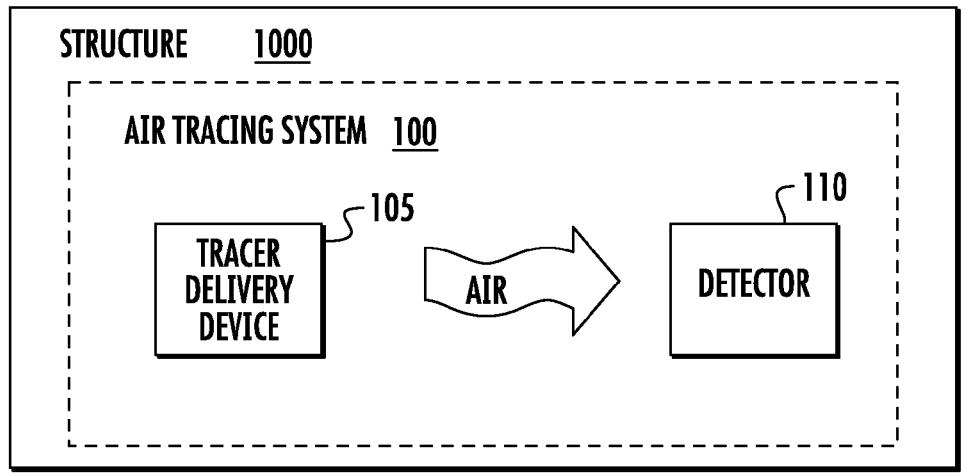
FIG. 1 shows a block diagram of an air tracing system in accordance with an illustrative embodiment of the invention located within a structure.

FIG. 1 shows a block diagram of an air tracing system 100 for tracing air movement in accordance with an illustrative embodiment of the invention. The air tracing system 100 is disposed within a structure 1000. The air tracing system 100 comprises a tracer delivery device 105 and a detector 110. The tracer delivery device 105 is operative to emit fine aerosol and gaseous particles of a tracer (i.e., analyte) into air at a first location in the structure 1000. The detector 110 is operative to detect the tracer at a second location in the structure after the tracer has been transported by the air. By detecting both temporal and concentration profiles for the tracer at the detector 110, the pattern of air flow within the structure 1000 may be characterized. The structure may be a building with or without a ventilation system, or alternatively, may be a portion of an air distribution system itself (e.g., fume hood or process exhaust).

Figure 2:
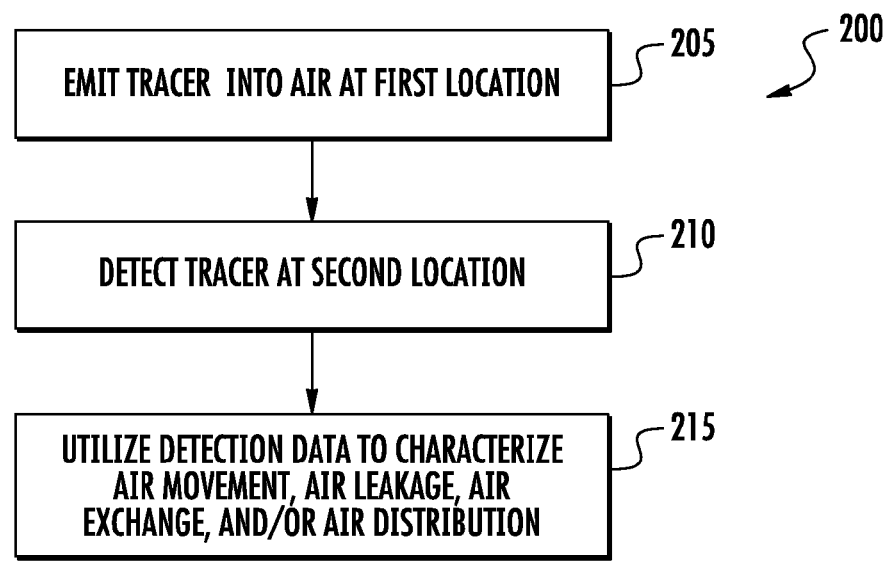
FIG. 2 shows a method for utilizing the FIG. 1 air tracing system to trace air in the FIG. 1 structure, in accordance with an illustrative embodiment of the invention.

A corresponding method 200 for utilizing the air tracing system 100 to trace air is shown in a flow diagram in FIG. 2. In step 205, a tracer is emitted into air at a first location. Subsequently, in step 210, the tracer is detected at a second location. Ultimately, in step 215, the detection data from step 210 is utilized to characterize at least one of air movement, air leakage, air exchange, and air distribution.

Additional details of the above-described system and method are now provided under several subheadings.

I. Tracers

Because of the several disadvantages of $SF_6$, a suitable alternative tracer for tracing air movement is highly attractive. In accordance with aspects of the invention, the tracer in the air tracing system 100 may comprise a terpene or a terpene alcohol. The terpene or terpene alcohol may be utilized without dilution or may be mixed with an organic solvent prior to being emitted into air. The organic solvent may comprise an alcohol, a ketone, an aromatic hydrocarbon, an aliphatic hydrocarbon, an ester, an ether, an amine, or some combination of these chemicals. Thus, in one or more embodiments falling within the scope of the invention, a tracer solution prior to being emitted may comprise undiluted terpene, undiluted terpene alcohol, or a combination thereof. In other embodiments, the tracer solution may comprise x weight percent terpene, terpene alcohol, or a combination thereof mixed with (100−x) weight percent organic solvent. It is noted that, as used herein and in the appended claims, the term "terpene" includes terpenenes, which are classified as terpenes.

One suitable terpene includes, for example, limonene ($C_{10}H_{16}$). Limonene is the main odor constituent in the citrus plant family. It is presently utilized in a number of different applications, including in, for example: air fresheners, food, cleaners, medicines, glues, solvents, and biofuels. It is thus readily available. It is typically produced from a renewable source (e.g., as a byproduct of orange juice manufacture).

One particularly suitable form of the tracer solution comprises d-limonene (i.e., (R)-enantiomer of limonene) mixed with isopropyl alcohol (hereinafter "LIPA"). Suitable concentrations for the d-limonene in such solutions include, for example, 1-99 weight percent. LIPA has several beneficial qualities. It is non-toxic and can be shipped without transport restrictions. LIPA is also a natural, "green" chemical mixture with no ingredients in the Toxic Substances Control Act (TSCA), or listed as a Superfund Amendments and Reauthorization Act (SARA) Title III compound, and is not regulated by the Clean Air Act. The ingredients are also classified as a food additive and granted the U.S. Food and Drug Administration (FDA) Generally Recognized as Safe (GRAS) status. LIPA is readily biodegradable under aerobic conditions (41-98% degradation by biochemical oxygen demand in 14 days), has a zero net global warming potential, and is an environmentally preferable product (EPP) formulation. LIPA has low toxicity to aquatic organisms, insects, and plants, and low acute and chronic toxicity. It further shows no contribution to global warming, depletion of stratospheric ozone, a relatively low reactivity in photochemical smog, and a low potential for ground level ozone formation. Because the LIPA components are extracted from naturally occurring sources, its use does not result in the release into the environment of any more materials than would occur naturally.

Terpene alcohols are structurally similar to terpenes but include hydroxyl groups. They may be primary, secondary, or tertiary alcohol derivatives of monocyclic, bicyclic, or acyclic terpenes. Suitable primary terpene alcohols include geraniol, while suitable secondary terpene alcohols include borneol. Suitable tertiary terpene alcohols include terpineol. For safety, it may be preferable to solvate these materials with an organic solvent formulation having a suitably high flashpoint, for example, a flashpoint greater than about 110 degrees Fahrenheit (about 43 degrees Celsius).

All of the above-described chemicals are commercially available. Most or all of the chemicals may be obtained from, for instance, SIGMA-ALDRICH® Corp. (St. Louis, Mo., USA).

The theoretical basis for tracer methods is the relationship between the mass or concentration of a gaseous or fine aerosol substance in a space as a function of time, and is a mass balance equation. This equation expresses that the mass concentration of a tracer gas can only change when either more tracer is added to the original amount or tracer gas is removed by elimination processes.

This mass balance equation is derived from the following differential equation:

$$VR*dCi(t)/dt=-Ci*Q+Ca*Q+E \text{ or } VR*dCi(t)/dt=-(Ci-Ca)*Q+E \quad \text{(Equation 1);}$$

where:
 $Ca$: tracer gas concentration in outside air [mass/volume];
 $Ci$: tracer gas concentration in the indoor air [mass/volume];
 $Q$: exchange air flow between room and outside [volume/time unit];
 $E$: amount of tracer gas emitted per unit time [mass/time unit];
 $VR$: room volume; and
 $t$: time.

Equation 1 may be used for instantaneous flow measurements by integrating Equation (1) as a function of time and rearranging, and the volumetric airflow rate may be determined to represent the air flow rates upstream and downstream of the injection point, respectively. The following applications for building science are available using LIPA technology and other tracer technologies falling with the scope of the invention based on volume/mass balance.

Air Change Rate (ACR):

Tracer gas may be injected into a room. After mixing with the room air, the tracer gas concentration is measured at regular time intervals. The decay curve of the tracer gas concentration C follows an exponential course when completely mixed with the room air. Approximately 37% (100/e1) of the originally added tracer gas should remain after one complete air change cycle has occurred. The time ($1/\lambda$), after which the air change cycle is completed is known as the "nominal time constant" $\tau$. After $3\tau(3/\lambda)$, $4\tau$ ($4/\lambda$), and $4.6\tau$ ($4.6/\lambda$), the tracer gas concentration in the room volume under study is 5%, 2%, and 1% of its initial value, respectively.

By using the concentration decay function, $C(t)=C0*e^{-k*t}$, where C0 is the tracer gas concentration at t=0, and applying nonlinear regression analysis, one can determine the ACR $\lambda$. Logarithmic concentration values are used to obtain a linear relationship between the logarithm of the tracer gas concentration $Ci(t)$ and the time t: $\ln Ci(t)=\ln C0-\lambda*(ti)$. The ACR $\lambda$ is then calculated via linear regression analysis according to this formula. Both evaluation options, the linear and the nonlinear regression analysis, are acceptable for the examination of concentration-time curves. $Ci(ti)$ is the tracer gas concentration at time ti, where ti is the time interval between two measurements.

Contaminant Removal Effectiveness (CRE):

CRE indicates the ability of the room ventilation system to remove airborne contaminants when the position of the contaminant source is known. Tracer may be used as a surrogate for the contaminant for measurement of CRE. The CRE is calculated as: $CRE=(Ce-Cs)/(Ci-Cs)$, where Ce is the contaminant concentration in the exhaust air, Ci is the mean contaminant concentration in the room, and Cs is the contaminant concentration in the supply air.

Air Change Efficiency (ACE):

ACE is a less direct indicator than the CRE and can be used when the position of the contaminant source is not specified. It is a measure of how fast the air in the room is replaced by the outside air in comparison with the theoretically fastest rate with the same ventilation airflow volume. It is defined as the ratio between the lowest possible mean age of air and the room mean age of air. $ACE=A_n/A_p \times 100$ (%), where $A_n$ is the local mean age of air at the exhaust, equal to the nominal time constant, and $A_p$ is the mean age of air at a particular point in the occupied zone. The mean age of air at a certain point is the mean transit time, or the time it takes for molecules of outside air to reach the point, plus the mean presence time.

Local Mean Age of Air:

Another way to express ACE is to compare the local mean age of air at the exhaust (the nominal time constant) with the local mean age of air at a point in the occupied zone. The pulse injection technique has the advantage over the other techniques in that it can be used to make an instantaneous measurement. The technique involves injecting a volume-weighted pulse of tracer aerosol into the supply air or return air for the zone, and then making a measurement at a one or more points some distance away from the injection point. The local mean age of air is calculated by dividing the first moment of the concentration (the integral of the concentration multiplied by the time) by the zeroth moment (the integral of the concentration). This technique is also useful for making measurements in a multiple zone system.

Airflow Through Ducts and Duct Networks:

Tracer gas methods have several advantages over pitot tube, vane anemometer, and hot wire anemometer measurements for flow in duct networks. Tracer gas does not require a long duct to develop laminar flow and does not require determination of the cross sectional area or knowledge of the flow profile across the duct. LIPA demonstrates good tracer gas mixing in a duct, as detailed below. Airflow is measured simply as the duct distance (d) divided by the time difference between measurements of a trace release in a duct ($C_{T1}$-$C_{T0}$).

II. Scent Tracking

The above-described tracers allow similar olfactory and sensor detection sensitivities for tracking of a scent release in ambient indoor spaces.

The LIPA tracer formulation when aerosolized evaporates in air and has a mild natural orange peel odor. The analyte is olfactory detectable in air above about 0.5 parts per million (ppm). The broadcast aerosol is non-irritating, non-sensitizing, and the natural odor is mild and pleasant at broadcast concentrations. The low human odor threshold property means that olfactory detection can be useful to supplement instrument readings when attempting to trace a labeled air mass over distances and between locations in a building or other structure.

III. Tracer Delivery Device

The tracer delivery device 105 in the air tracing system 100 preferably produces heterodisperse aerosols with particle size characteristics that enable rapid sublimation under ambient indoor conditions and long-range transport of the tracer in the surrounding air. In various embodiments, for example, particles may be micron sized. Suitable tracer delivery devices may include atomizers, nebulizers, and evaporators.

A suitable jet nebulizer for use in the air tracing system 100 is, for example, a Micro Mist available from TELEFLEX® Inc. (Limerick, Pa., USA). A suitable steam nebulizer is, for example, a CEM-system available from BRONKHORST® High-Tech B.V. (Ruurlo, Netherlands). A suitable ultrasonic nebulizer is, for example, a NB-59S-09S available from TDK® Corp. (Tokyo, Japan). A suitable ultrasonic atomizing nozzle is, for example, a microspray nozzle available from Sono-Tek Corp. (Milton, N.Y., USA). A suitable ultra-low volume (ULV) fogger is, for example, a ULV-60A available from Shenzhen Send-tech Co., Ltd. (Guangdong, China). Lastly, a suitable thermo-fogger is, for instance, a BW-20, again available from Shenzhen Send-tech.

Nevertheless, any other suitable means for converting the tracer solution into small particles for fine aerosol and gaseous vapor distribution would also fall within the scope of the invention.

During operation, the tracer delivery device 105 in the air tracing system 100 may be operated so as to emit the tracer into the surrounding air in a continuous manner, or may be operated so as to emit the tracer into the surrounding air in temporally separated pulses (i.e., "puffs").

IV. Detector

Figure 3:
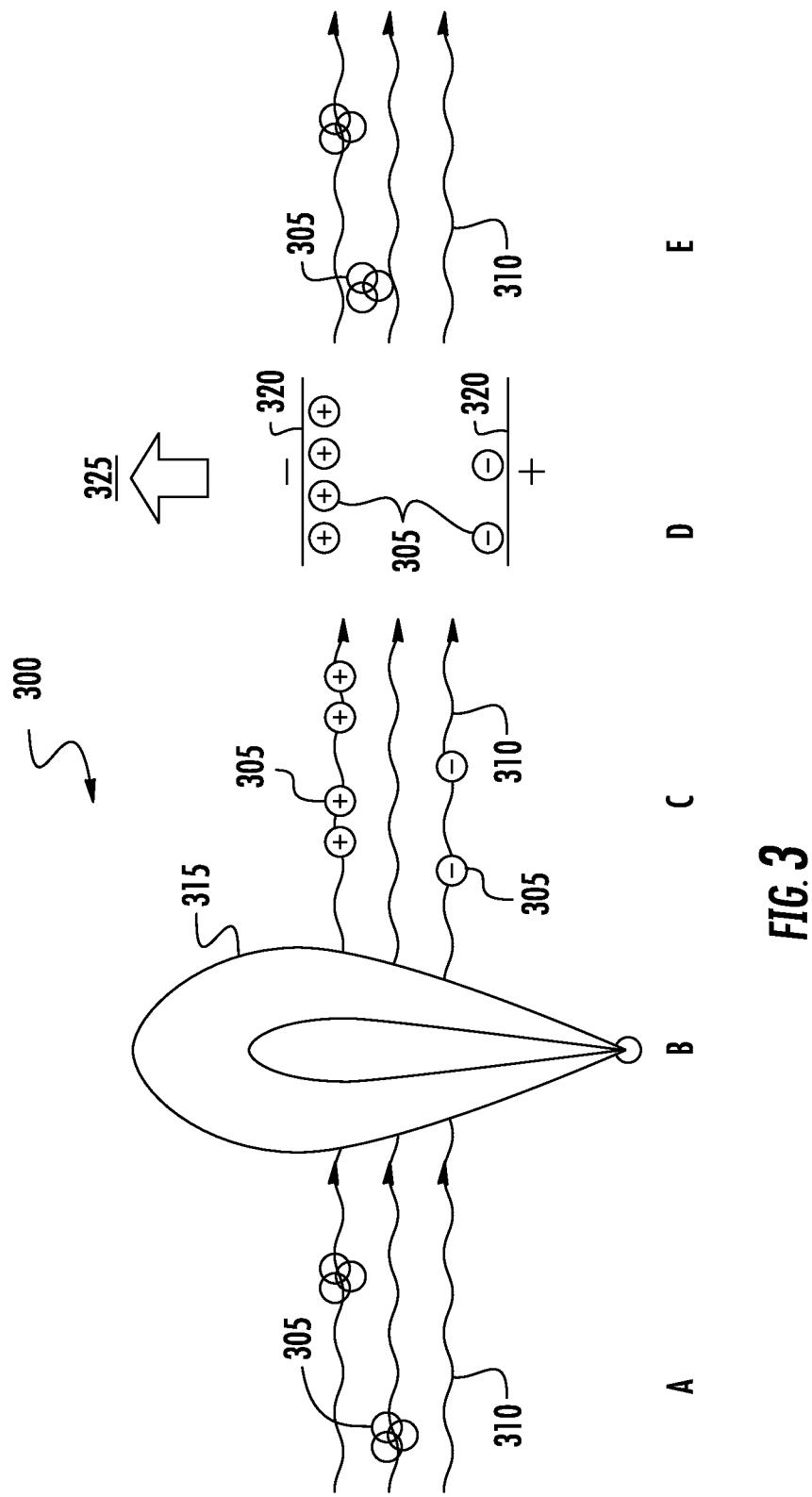
FIG. 3 shows a diagrammatic depiction of elements of a photoionization detector and the manner in which it measures the concentration of a tracer in air.

The detector 110 in the air tracing system 100 may comprise a photoionization detector (PID). This is believed to be the first use of photoionization sensing for tracing a labeled air mass. FIG. 3 shows a schematic diagram of the manner in which an illustrative PID 300 may operate to detect tracer molecules in air. At position A, tracer molecules 305 carried in air 310 enter the PID 300. At position B, the tracer molecules 305 and the air 310 pass by an ultraviolet (UV) lamp 315 where they are bombarded by high energy UV photons, which act to cause some fraction of the tracer molecules 305 to be ionized (position C). The now at least partially ionized tracer molecules 305 and the surrounding air 310 then travel to position D, where two charged plates 320 cause each of the ionized tracer molecules 305 to segregate to a respective one of the two charged plates 320 that is opposite in polarity. A current 325 is thereby created in the charged plates 320, which is amplified and measured by the PID 300, and converted into a concentration value. The greater the concentration of the charged tracer molecules 305, the greater the current. The concentration value may be displayed on the PID 300 and recorded as a function of time in a form of data logging. The tracer molecules 305 and the air 310 exit the PID 300 at position E.

Given the manner in which a PID operates, the PID 300 may detect other components in the air 310 that have an ionization potential below the energy of the UV lamp 315. To account for these background species, a background current may be measured at the PID 300 before releasing any tracer. The detector 110 may be zeroed to this background current so that only the presence of the tracer is recorded.

Many PIDs suitable for use in the air tracing system 100 are commercially available. Miniaturization allows these PIDs to come as small, handheld, low-cost, battery-operated, continuous monitors that can provide instantaneous feedback to their users. Concentration measurement accuracy may be within about ten percent. A suitable PID includes a Tiger PID available from ION SCIENCE® Inc. (Stafford, Tex., USA).

In addition to PIDs, several other suitable types of detectors may be utilized as the detector 110 in the air tracing system 100, and their use would also fall within the scope of the invention. For example, an alternative detector 110 may comprise a metal-oxide-semiconductor (MOS) gas sensor. These MOS devices may be specifically designed for a broad detection of reducing gases such as volatile organic compounds (VOCs). Commercial examples include the AS-MLV-P2 from AMS® AG (Unterpremstatten, Austria), and the TGS 823 from FIGARO® USA, Inc. (Arlington Heights, Ill., USA). Alternatively, the detector 110 may comprise a microelectromechanical-systems (MEMS) gas sensor such as the TGS 8100, also available from FIGARO®

V. LIPA and PID Sensing

Experiments with LIPA and PID sensing were conducted in a test chamber, in ambient building air, and in air ducts. For these experiments, Tiger PIDs from ION SCIENCE® were utilized as detectors. The instruments received single point calibrations (100 parts per million (ppm) isobutylene) and were time synchronized using a laptop computer prior to testing. The Tiger PIDS provided good precision throughout the experimental program.

A. Test Chamber

The laboratory tracer chamber for tracer tests included a one cubic foot air pressure attenuator with 100+ feet of PVC three-inch duct, duct fittings, in-line fan, and dedicated exhaust. Duct air velocity was controlled and was measured using a hot wire anemometer. Static pressures were monitored using a magnehelic gauge. The test chamber allowed recording measurement of air flow, pressure, temperature, relative humidity, and PID sampling at various placement locations; varying air velocity (50-600 feet per minute (fpm)); and entry of tracer/dilution damper control/airspeed control. In addition, a FANTECH® AEV1000 fan-powered mixing box with three-inch Vokes-Air EN1822-H14 filter was used for the filtration tests. Tracer release was started and stopped with a switch and the broadcast concentration was adjusted with a reagent flow dial while monitoring with PIDs placed at sampling locations and providing near real time concentration measurements, which allowed adjusting the tracer concentration in the chamber air stream.

Experiments identified measurement sensitivity for near real time monitoring of the broadcast LIPA tracer at low parts per million, with a useful working range between about 0.05-1,000 ppm. This allowed measurements at both high concentrations in mixed air just downstream of the emitter as well as at low concentrations further away away from the emitter.

Figure 4:
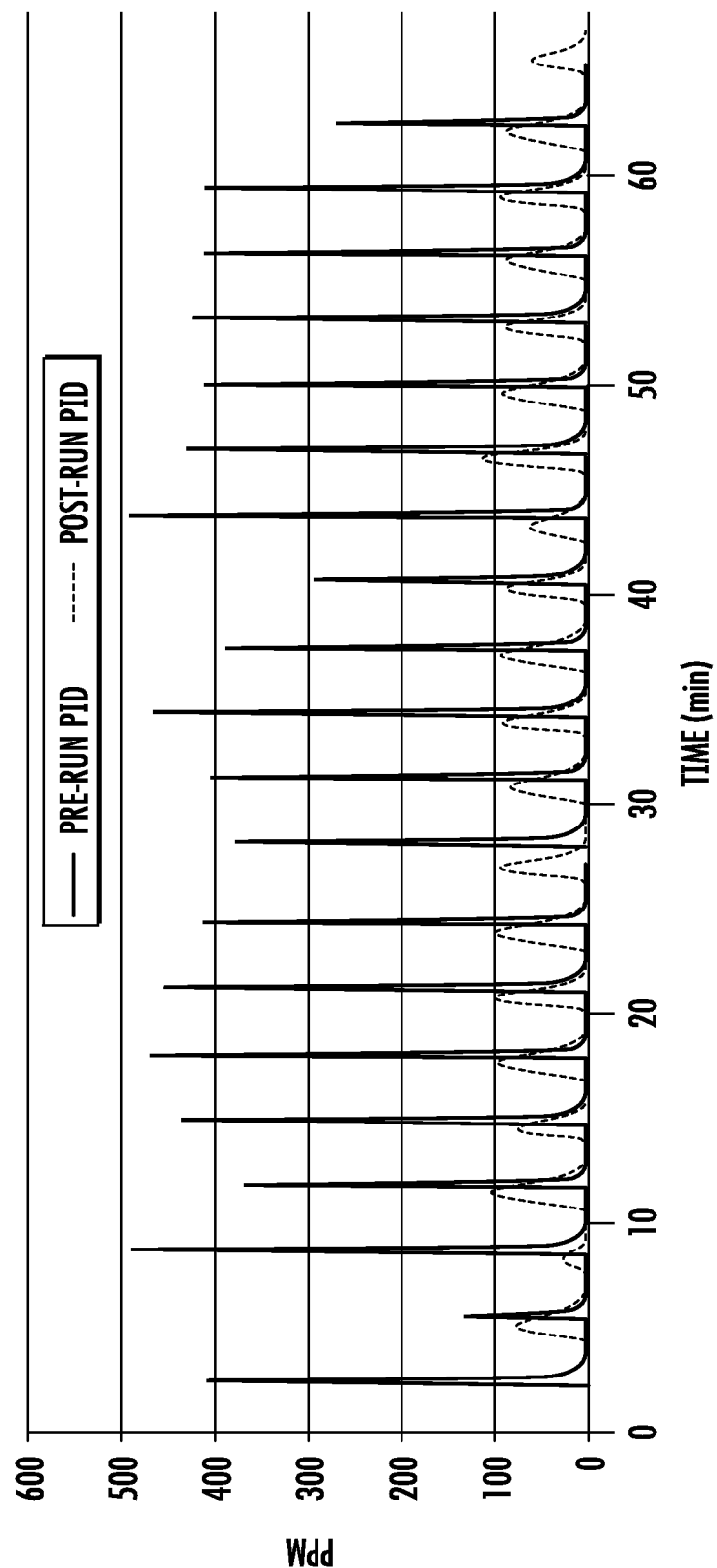
FIG. 4 shows measurements of a tracer in a duct.

FIG. 4 shows PID measurements of twenty successive one-second manual releases (i.e., puffs) of tracer in the duct at a PID close to the release point ("Pre-Run") and at a PID 100 feet from the release point ("Post-Run"). The time interval between corresponding peaks at each PID represents the flow time between the detectors, and provides a direct measure of the average velocity of air flow in the duct. Duct velocity during this test happened to be 53 fpm. Similar experiments were performed for other air velocities and the results corresponded well to measurements made by the anemometers.

Figure 5:
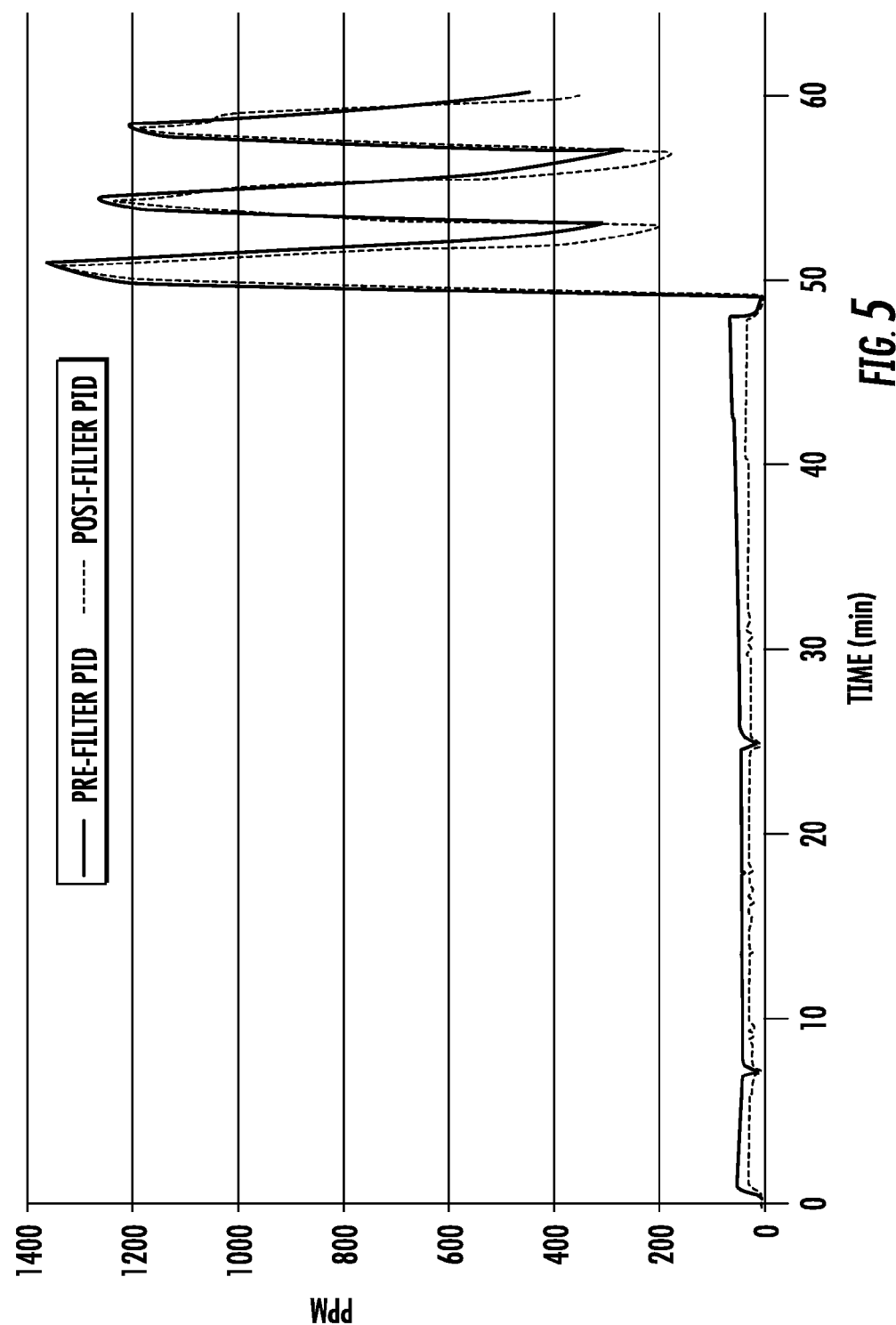
FIG. 5 shows measurements of a tracer in a duct with a filter.

Experiments were also performed to determine the transport characteristics of LIPA through the filter set forth above. The setup included an intake air fan (pushing fan) and an in line exhaust air fan that allowed altering pressure across the filter. Air flows from the two fans were balanced to provide air flow with little static pressure drop across the filter, as well as a range of adjusted pressure drops and air flow velocities. FIG. 5 shows the PID measurements pre- and post-filter. In the experiment depicted, seven fpm of air flow through the filter at <0.05 inches water column (WC) gauge static pressure drop was maintained, and the tracer emitting rate maintained constant at 50 ppm and then spiked to 1,200 ppm. This experiment showed about 20 ppm tracer attenuation through the air filter at low face velocity and low static pressure, and this attenuation appeared not to vary as tracer concentrations were increased.

B. Building

Building-scale testing was utilized to compare $SF_6$ tracer and LIPA tracer field performance. The Kelder Building on the State University of New York (SUNY) Ulster New York Campus was used for the measurements. This building is designed as a "Pressure House" with a tight building envelope, zone pressure monitoring, electronic damper controls panel, and a small ducted HVAC system.

The American Society of Heating, Refrigerating, and Air-Conditioning Engineers (ASHRAE) Standard 129 tracer decay method is applicable for any space, mechanically ventilated or not, and with either single or multiple supply and exhaust ducts, as long as uniform distribution of tracer can be achieved by whatever means. In this method, the tracer is injected into and dispersed throughout the space with the aid of portable fans to achieve uniform mixing. After a uniform condition is achieved, tracer addition is stopped at time zero and concentration is recorded as it falls to zero (or background) or at least 95% of the uniform initial concentration. The recorded decay of concentration with time gives the cumulative age distribution of the air or the air change rate. The variable factors that control the air change rate include the amount of air being exhausted from the space, the amount of supplied outside air, and air leakage. Unlike $SF_6$, PID-sensitive LIPA tracer is a chemically simple, natural organic mixture that biodegrades in the environment, and therefore "wash-out" is recognized as a potential contributor to decay for this mixture during the measurement period.

Prior to the start of the building experiments, the building alarm detectors were tested for response to the LIPA tracer by emitting tracer at these detectors. Building fire/smoke/CO detectors did not respond to the presence of the LIPA.

A zone consisting of the lower floor classroom was isolated. $SF_6$ and LIPA were released together into the space. The space was surveyed to verify good mixing at the desired starting concentration. A slight positive pressure was maintained using a blower door. The blower door was monitored to maintain a constant pressure throughout the tracer decay measurement period. Blower door calculated air changes per hour (ACH) and the decay rates of LIPA and $SF_6$ were measured during a 3-hour measurement period.

The zone data was as follows:
Classroom Area: 694 square feet;
Classroom Volume: 5,787 cubic feet;
Room pressure: +2.2 Pascal with reference to outside;
Air flow: 92 cubic feet per minute; and
Air changes per hour: 0.95

For the tracer gas decay experiments, the indoor air was labeled uniformly with $SF_6$ and LIPA tracer using two room fans and monitored to verify uniform distribution at the desired starting concentration, with the experimental objective to measure the time required to replace this "labeled" indoor air with tracer-free outside air. After an acceptably-uniform initial tracer gas concentration was attained, the blower door fan was started, and the tracer injection was stopped. Tracer gas concentrations were measured as a function of time at various indoor locations using two IR detectors for $SF_6$, and three PIDs for LIPA measurements.

Figure 6:
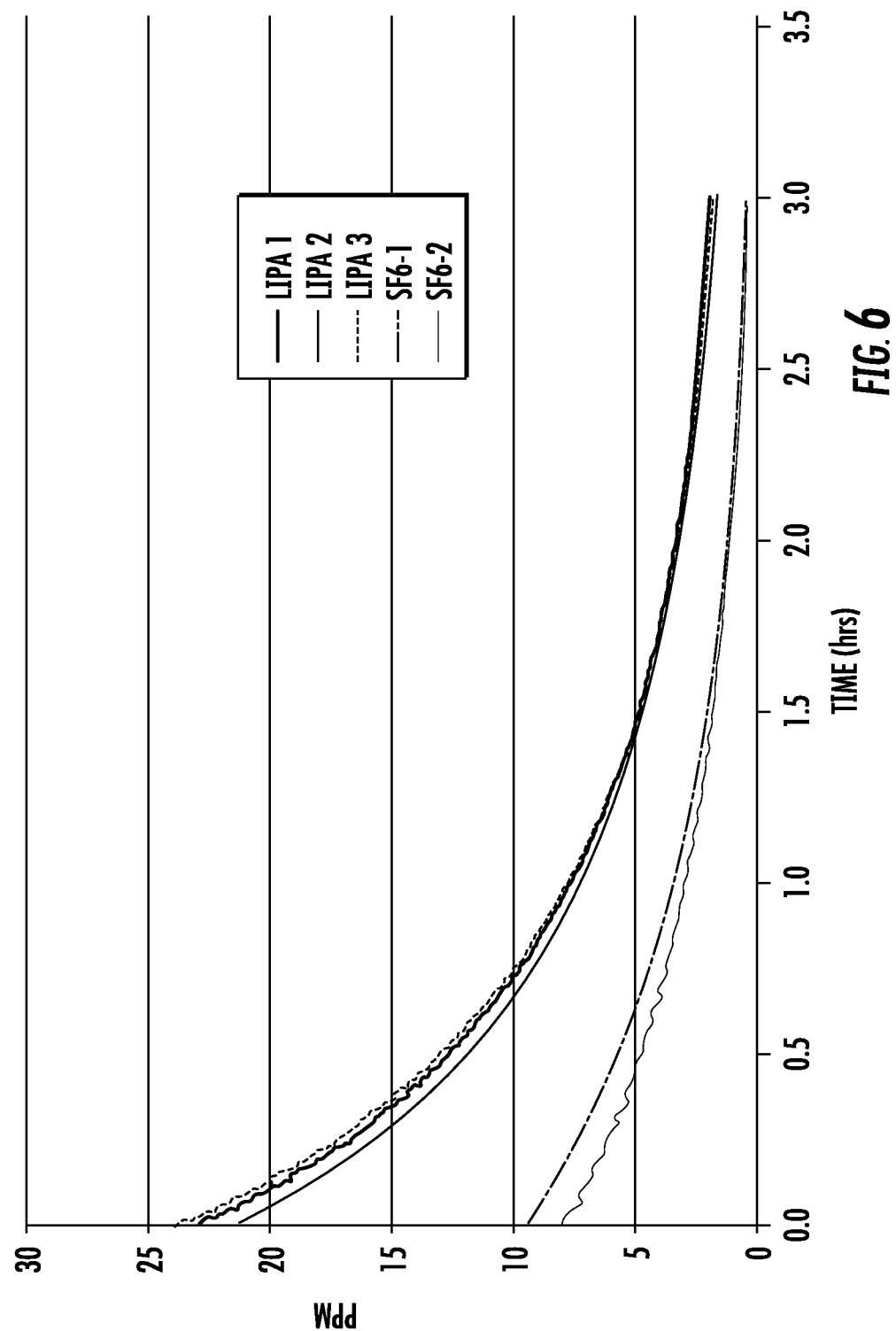
FIG. 6 shows measurements of tracers in a room.

FIG. 6 shows the decay of concentration with time for both LIPA and $SF_6$ over three hours. The curves show that LIPA decays more rapidly than $SF_6$. The curves further demonstrate good measurement precision between the three PID detectors placed at different room locations.

C. Air Duct

A unique capability of LIPA technology is the ability to measure in near real time. This allows measurements of concentration differences of tracer in ducts. By measuring the tracer gas concentration in both the return air duct (Cr(t)) and the mixed air supply duct (Cs(t)) and applying a mass balance, the percentage of outside air in the supply air (% OA) can be determined by the formula:

$$\% \ OA = 100\% \times [Cr(t) - Cs(t)]/Cr(t).$$

In these experiments, puffs of LIPA were released into a return air (RA) register and measured with PID detectors placed downstream in the RA duct, and at supply-duct locations following outdoor air mixing before (SA1) and after (SA2) the air handling unit.

Figure 7:
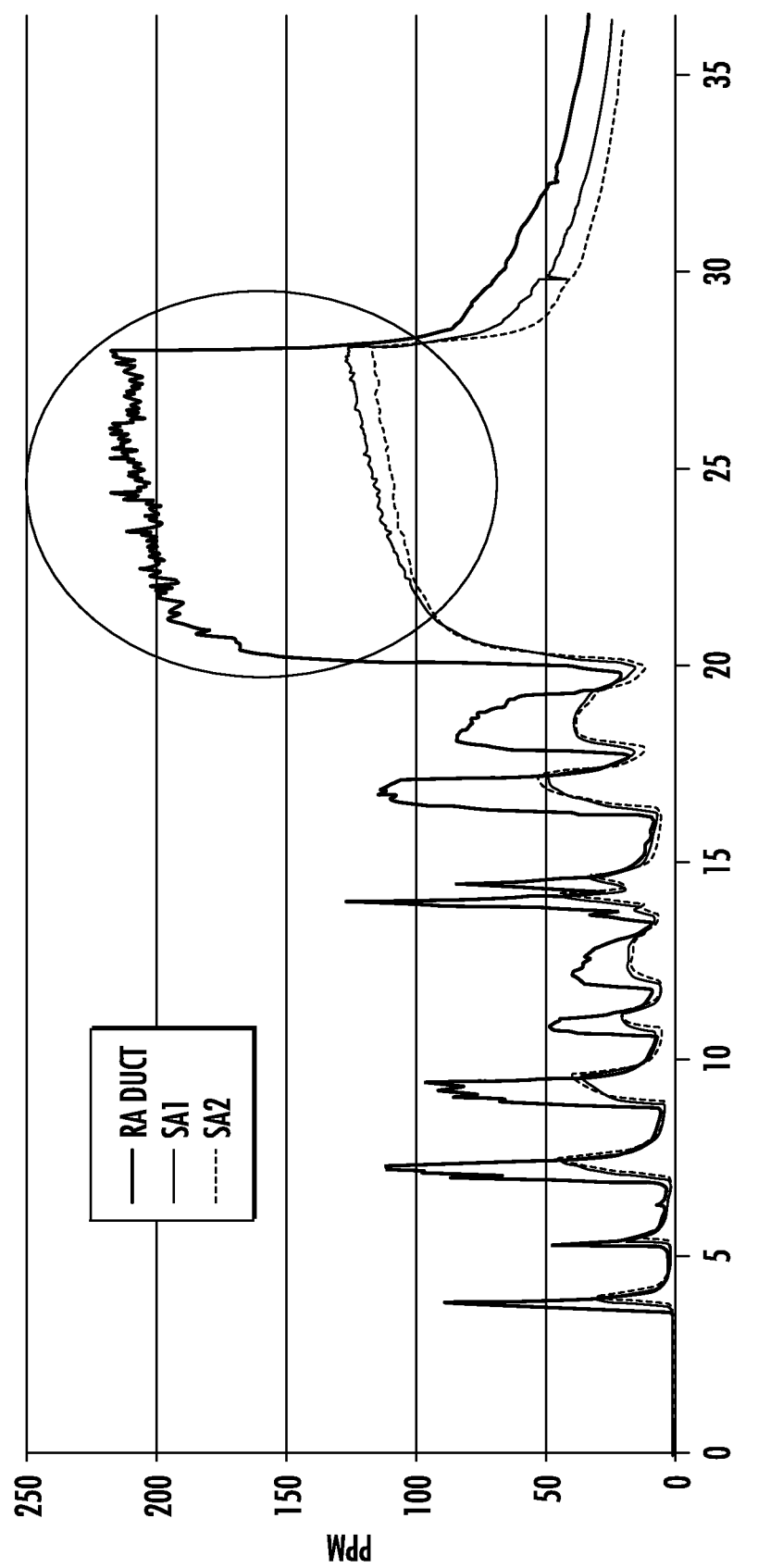
FIG. 7 shows measurements of a tracer in a ventilation system.

FIG. 7 shows concentration measurements at the various PIDs. LIPA was released in puffs for the first approximately 20 minutes of the measurement, and then released continuously from about 20-28 minutes, after which the LIPA source was turned off. The difference between LIPA concentration in the RA duct and in the SA1 and SA2 locations allow determination of % OA by the formula set forth above. Variations in the second-by-second measurements indicate how well the tracer was mixed with the turbulent ducted air stream. The figure shows less detector variation at locations with greater mixing downstream of the mixing box than the return air measurement locale.

Although the emitting rate of the tracer in the return air duct was held constant during the five-minute period depicted in the circled region of FIG. 7, tracer levels increased steadily due to return air from the labeled supply air re-entering the RA duct during the test period. This re-entrainment of the tracer in the RA duct added additional tracer at the RA measurement locale resulting in the steady rise in measured tracer concentration in the air ducts. FIG. 7 demonstrates that differential measurements from one PID located in the return duct and one in the supply duct can give almost real time direct measurements of percent outdoor air in the mixed air stream in turbulent air flows through filters and coils absent steady state conditions, using short releases of LIPA in the return duct.

Notably, due to the long averaging time for sample measurements and the absence of steady-state tracer concentrations, $SF_6$/IR equipment was not capable of measuring concentration differences in an air duct at different locations in the manner of the newly introduced LIPA/PID system.

D. Summary of Experimental Results

The several experiments set forth above describe an innovative technology that can be used as a sensitive reporter of the labeled air mass, using short "puff" releases or longer constant concentration releases of a "green" chemical labelling agent in combination with photoionization sensing. The LIPA tracer remained in the air sufficiently long and with sufficient detection sensitivity using PID detectors to be useful for tracking air distribution and mixing. The ability to safely label air with a known tracer concentration and to continuously measure it over a broad range of detection in near real time are unique characteristics of the LIPA technology that cannot be achieved using $SF_6$/IR technology or other means.

The experiments further demonstrated rapid instrument recovery and broad measurement ranges using PID detection. LIPA concentrations in the tests ranged between 1,100 ppm down to 0.001 ppm. This allowed measurements of both high concentrations near release points as well as at low ambient air tracer levels using instruments with the same detector, calibration, and data format, and with good precision between detectors at these detection ranges.

Measurements from synchronized detectors provided near real time comparable data from multiple discrete locations with good precision between instruments. Chamber, duct, and room experiments showed the LIPA reagent sublimates and mixes into an air mass or parcel, and remains in the air sufficiently long to be carried and distributed through space and measured over time scales up to several hours.

Lastly, the experiments showed that a small amount of an environmentally safe tracer can be injected into an air mass for a short duration, for example, into a return air duct or at a point within the room, and measured to provide data on air distribution and ventilation based on time and tracer concentration at the locations of interest. The experiments showed the tracer passes through HVAC coils and fabric filters with little attenuation, and good mixing was achieved to label an air flow in a duct so as to allow measurements even where steady-state conditions were not achieved.

VI. Advantages

Aspects of the invention provide several advantages over conventionally utilized air tracing systems and methods such as those that rely on using $SF_6$ with infrared detection. With respect to the terpene and terpene alcohol tracers set forth herein, for example, these materials are naturally occurring, have low toxicity, have low environmental burden, are biodegradable, have good residence time and low drift, readily pass through fabric filters, are readily available at relatively low cost, and allow measurements over a broad concentration range (e.g., about 0.001-1,100 ppm) using PIDs in almost real time. The tracers may furthermore be broadcast into air using commercially available broadcast means such as jet nebulizers, ultrasonic nebulizers, ultrasonic nozzles, and thermo-foggers. PIDs serving as detectors are simple to use, often handheld, relatively inexpensive, commercially available, provide good measurement precision, and provide continuous measurements with rapid response and recovery times. The rapid response times allow tracer measurements that are highly resolved in time and that provide complete pictures of variations in both temporal and spatial mass concentrations at different detector locations.

In closing, it should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art.

In even other embodiments falling within the scope of the invention, for example, a tracer solution comprising an alcohol but devoid of a terpene or a terpene alcohol (a "terpene-free alcohol tracer solution") may be used as a tracer solution with a PID utilized as a detector. Suitable alcohols include, for example, aliphatic alcohols such as ethanol and isopropanol. Sensitivities to these alcohols utilizing PIDs is believed to be many times below that for terpene-containing and terpene-alcohol-containing tracer solutions. Nevertheless, such terpene-free alcohol tracer solutions remain candidates for use in applications where such sensitivity may be less critical.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in AIA 35 U.S.C. §112(f). In particular, the use of "step of" in the claims herein is not intended to invoke the provisions of AIA 35 U.S.C. §112(f).

What is claimed is:

1. A system comprising:
   a tracer delivery device operative to emit a tracer comprising at least one of a terpene and a terpene alcohol into air; and
   a detector operative to detect the tracer in the air.

2. The system of claim 1, wherein the tracer delivery device comprises at least one of an atomizer, a nebulizer, and an evaporator.

3. The system of claim 1, wherein the tracer delivery device comprises at least one of a jet nebulizer, an ultrasonic nebulizer, an ultrasonic nozzle, and a thermo-fogger.

4. The system of claim 1, wherein the tracer delivery device emits the tracer into the air in temporally separated pulses.

5. The system of claim 1, wherein the tracer comprises limonene.

6. The system of claim 1, wherein the tracer comprises at least one of geraniol, borneol, and terpineol.

7. The system of claim 1, wherein the tracer is mixed with an organic solvent before being emitted by the tracer delivery device.

8. The system of claim 7, wherein the organic solvent comprises an alcohol.

9. The system of claim 8, wherein the alcohol comprises isopropyl alcohol.

10. The system of claim 7, wherein the organic solvent comprises at least one of a ketone, an aromatic hydrocarbon, an aliphatic hydrocarbon, an ester, an ether, and an amine.

11. The system of claim 1, wherein the detector comprises a photoionization detector.

12. The system of claim 1, wherein the detector comprises a metal-oxide-semiconductor gas sensor or a microelectromechanical-systems gas sensor.

13. A method comprising the steps of:
emitting a tracer comprising at least one of a terpene and a terpene alcohol into air using a tracer delivery device; and
detecting the tracer in the air using a detector.

14. The method of claim 13, wherein the tracer delivery device comprises at least one of an atomizer, a nebulizer, and an evaporator.

15. The method of claim 13, wherein the tracer comprises limonene.

16. The method of claim 13, wherein the tracer is mixed with an organic solvent before being emitted by the tracer delivery device.

17. The method of claim 16, wherein the organic solvent comprises an alcohol.

18. The method of claim 13, wherein the detector comprises a photoionization detector.

19. The method of claim 13, wherein the detector comprises a metal-oxide-semiconductor gas sensor or a microelectromechanical-systems gas sensor.

20. A method comprising the steps of:
emitting a tracer comprising at least one of a terpene and an alcohol into air using a tracer delivery device; and
detecting the tracer in the air using a photoionization detector.

* * * * *